US009821657B2

(12) United States Patent
Gan (10) Patent No.: US 9,821,657 B2
(45) Date of Patent: Nov. 21, 2017

(54) DROWSY DRIVER DETECTION

(71) Applicant: Motorola Mobility LLC, Chicago, IL (US)

(72) Inventor: Su-Yin Gan, San Francisco, CA (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 289 days.

(21) Appl. No.: 14/693,093

(22) Filed: Apr. 22, 2015

(65) Prior Publication Data

US 2016/0311440 A1  Oct. 27, 2016

(51) Int. Cl.
*B60W 40/08* (2012.01)
*B60K 28/06* (2006.01)

(52) U.S. Cl.
CPC .................... *B60K 28/06* (2013.01)

(58) Field of Classification Search
CPC ......... B60W 40/08; B60W 2040/0827; B60W 2040/0818; B60W 2040/0836; B60W 2040/0845; A61B 5/18; A61B 5/7264; B60K 28/06; B60K 28/066; G08B 21/06
USPC ...................... 340/573.1, 575, 576
See application file for complete search history.

(56) References Cited

U.S. PATENT DOCUMENTS

| | | | |
|---|---|---|---|
| 5,917,415 A | 6/1999 | Atlas | |
| 7,692,552 B2 | 4/2010 | Harrington et al. | |
| 2014/0125491 A1* | 5/2014 | Park | H04W 4/027 340/870.01 |
| 2014/0139655 A1 | 5/2014 | Mimar | |
| 2015/0342533 A1* | 12/2015 | Kelner | A61B 5/721 600/509 |
| 2016/0090097 A1* | 3/2016 | Grube | B60W 40/08 340/576 |
| 2016/0176409 A1* | 6/2016 | Kirsch | B60W 40/08 701/37 |

* cited by examiner

*Primary Examiner* — Brian Wilson (57) ABSTRACT

In embodiments of drowsy driver detection, a drowsy driver mode is initiated on a wearable wireless device being worn by a user in response to detecting that the user is driving a vehicle. The drowsy driver mode causes the wearable wireless device to use a first sensor to generate first sensor data which can be analyzed to detect a drowsy driver condition. In response to detecting the drowsy driver condition, a second sensor on the wearable wireless device is activated to generate second sensor data that can be analyzed to confirm the drowsy driver condition. In response to confirming the drowsy driver condition, one or more alerts are initiated. Generally, the alerts are intended to wake up the user, warn other passengers in the vehicle that the user is drowsy or otherwise impaired, and/or notify an emergency operator.

20 Claims, 4 Drawing Sheets

DROWSY DRIVER DETECTION

BACKGROUND

The driver of a vehicle should be alert and focused in order to avoid an accident. Notably, the likelihood of an accident occurring are greatly increased when the driver of the vehicle becomes drowsy, falls asleep, or suffers a medical condition, such as a heart attack, a seizure, or a stroke.

BRIEF DESCRIPTION OF THE DRAWINGS

Embodiments of drowsy driver detection are described with reference to the following Figures. The same numbers may be used throughout to reference like features and components that are shown in the Figures.

DETAILED DESCRIPTION

Drowsy driver detection techniques are described. In various embodiments, a drowsy driver module is configured to initiate a drowsy driver mode on a wearable wireless device in response to detecting that a user of the wearable wireless device is driving a vehicle. The drowsy driver module can be implemented at the wearable wireless device and/or at an additional wireless device that is wirelessly connected to the wearable wireless device. For example, a user may wear a wearable wireless device on her wrist (e.g., a smart watch) that is wireless connected to a wireless device (e.g., a smart phone) in her purse.

In the drowsy driver mode, the wearable wireless device monitors the user with one or more sensors, such as an accelerometer, a gyroscope, or a heart rate monitor. The drowsy driver module receives sensor data from the one or more sensors of the wearable wireless device, and analyzes the sensor data to determine whether the user is drowsy or otherwise impaired. Responsive to detecting that the user is drowsy or otherwise impaired, the drowsy driver modules initiates one or more alerts that are intended to wake up the user, warn other passengers in the vehicle that the user is drowsy or otherwise impaired, and/or notify an emergency operator.

In one or more embodiments, the drowsy driver module uses a multi-step process to determine whether the user is drowsy or otherwise impaired. In the multi-step process, one or more first sensors (e.g., a motion sensor) of the wearable wireless device generate sensor data that is analyzed by the drowsy driver module to detect a drowsy driver condition. When the drowsy driver condition is detected, it triggers the drowsy driver module to cause activation of one or more second sensors (e.g., a heart rate monitor) on the wearable wireless device to generate second sensor data. The drowsy driver module analyzes the second sensor data to confirm the drowsy driver condition, and initiates one or more alerts if the drowsy driver condition is confirmed.

As compared to conventional solutions, this multi-step process provides for a more accurate means for detecting a drowsy driver because the drowsy driver condition is detected and confirmed using at least two different sensors. In addition, the multi-step process provides for reduced power consumption in the wearable wireless device, which extends the battery life of the wearable wireless device, because the second sensor is not activated until it is needed to confirm the drowsy driver condition.

While features and concepts of drowsy driver detection can be implemented in any number of different devices, systems, and/or configurations, embodiments of drowsy driver detection are described in the context of the following example devices, systems, and methods.

Figure 1:
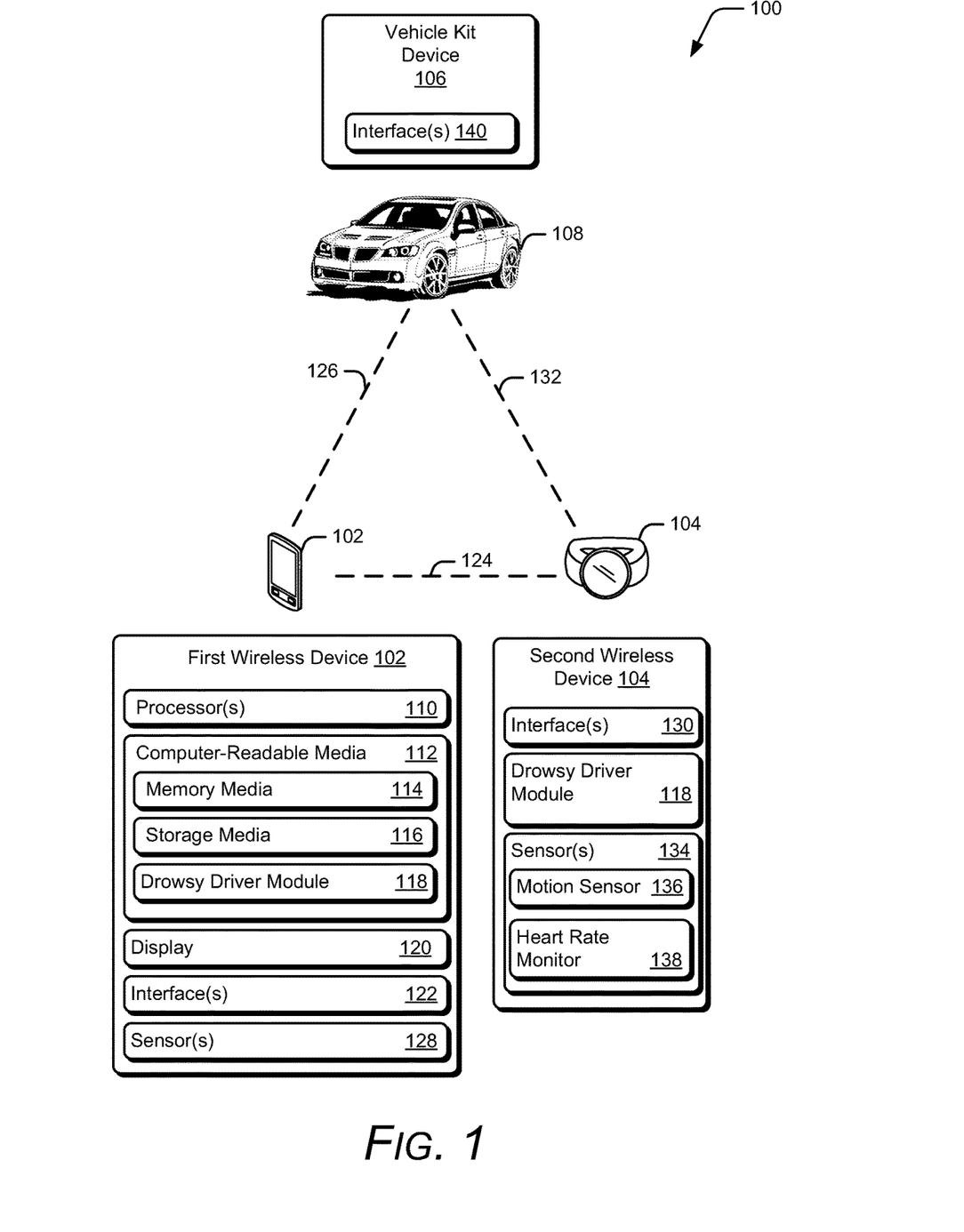
FIG. 1 illustrates an example environment in which techniques for drowsy driver detection can be implemented.

FIG. 1 illustrates an example environment 100 in which techniques for drowsy driver detection can be implemented. Example environment 100 includes a wireless device 102, a wearable wireless device 104, and a vehicle kit device 106 that is implemented in a vehicle 108. By way of example, and not limitation, vehicle 108 can be implemented as a car, motorcycle, bus, train, boat, or plane.

Wireless device 102 is illustrated in example environment 100 as a smart phone. It is to be appreciated, however, that wireless device 102 may also be implemented, by way of example and not limitation, as a tablet, a laptop, or any other type of phone, mobile device, portable device, and so forth.

Wireless device 102 includes processors 110 and computer-readable media 112, which includes memory media 114 and storage media 116. Computer-readable media 112 also includes a drowsy driver module 118, which will be described in more detail below. Wireless device 102 further includes a display 120 that can be controlled to render images for viewing.

Wireless device 102 may also include interface(s) 122 that enable wired and/or wireless communication of data. Interfaces 122 can include wireless personal-area-network (WPAN) radios compliant with various WPAN standards, such as IEEE 802.15 standards, Bluetooth™ standards, infrared data association (IrDA) standards, or wireless USB standards, to name just a few. Interfaces 122 can also include, by way of example and not limitation, wireless local-area-network (WLAN) radios compliant with any of the various IEEE 802.11 (also referred to as WiFi™) standards, wireless-wide-area-network (WWAN) radios for cellular telephony, wireless-metropolitan-area-network (WMAN) radios compliant with various IEEE 802.16 (also referred to as WiMAX™) standards, and wired local-area-network (LAN) Ethernet transceivers. Interfaces 122 may also include an interface that enables wireless device 102 to communicate over a cellular communication network, such as a Global System for Mobile Communications (GSM) network, a Long Term Evolution (LTE) network, a Code Division Multiple Access (CDMA) network, or a Wideband Code Division Multiple Access (WCDMA) network.

In example 100, interface 122 enables wireless device 102 to establish a wireless connection 124 with wearable wireless device 104. In some embodiments, wireless connection 124 may be a transport-agnostic WPAN communication link. Wireless connection 124 enables data to be communicated wirelessly between wireless device 102 and wearable wireless device 104. Interface 122 may further enable wireless device 102 to scan for and detect other wireless devices, such as vehicle kit device 106, via a wireless link 126.

Wireless device 102 may also include one or more sensors 128 that are configured to receive sensor data, such as sensor data corresponding to movement. Sensors 128 can include an accelerometer sensor configured to receive accelerometer data, a global positioning system (GPS) sensor configured to receive GPS data, or any other type of sensor configured to sense movement. Wireless device 102 can also be implemented with any number and combination of differing components as further described with reference to the example device shown in FIG. 4.

In one or more embodiments, wearable wireless device 104 is a "wrist-worn" wearable wireless device that is configured to be worn on the wrist of the user, such a smart watch or a smart bracelet (e.g., a fitness band). It is to be appreciated, however, that wearable wireless device 104 can be implemented as any type of wearable wireless device, such as a smart ring, smart glasses, and so forth.

Similar to wireless device 102, wearable wireless device 104 includes interface(s) 130 that enable wired and/or wireless communication of data. Interfaces 130 can include WPAN radios compliant with various WPAN standards, such as IEEE 802.15 standards, Bluetooth™ standards, IrDA standards, or wireless USB standards, to name just a few. Interfaces 130 can also include, by way of example and not limitation, WLAN radios compliant with any of the various IEEE 802.11 (also referred to as WiFi™) standards, WWAN radios for cellular telephony, WMAN radios compliant with various IEEE 802.16 (also referred to as WiMAX™) standards, and wired LAN Ethernet transceivers.

In example 100, interface 130 enables wearable wireless device 104 to establish wireless connection 124 with wireless device 102. In one or more implementations, interface 130 further enables wearable wireless device 104 to establish a wireless link 132 with vehicle kit device 106. In some embodiments, wireless link 132 may be an active WPAN link that enables communication between wearable wireless device 104 and vehicle kit device 106.

Wearable wireless device 104 may also include one or more sensors 134. In this example, sensors 134 are illustrated as including, by way of example and not limitation, a motion sensor 136 and a heart rate monitor 138. Motion sensor 136 is configured to sense movement and generate motion data based on the movement. When wearable wireless device 104 is implemented as a wrist-worn device, the motion data may correspond to movement of the user's hand or arm. Motion sensor 136 may include, by way of example and not limitation, an accelerometer or a gyroscope. Heart rate monitor 138 is configured to sense a current heart rate of the user, and to generate heart rate data based on the current heart rate of the user. As described in more detail below, the motion data and the heart rate data may be communicated to drowsy driver module 118 to enable the drowsy driver module to detect that the user is drowsy or otherwise impaired.

Figure 4:
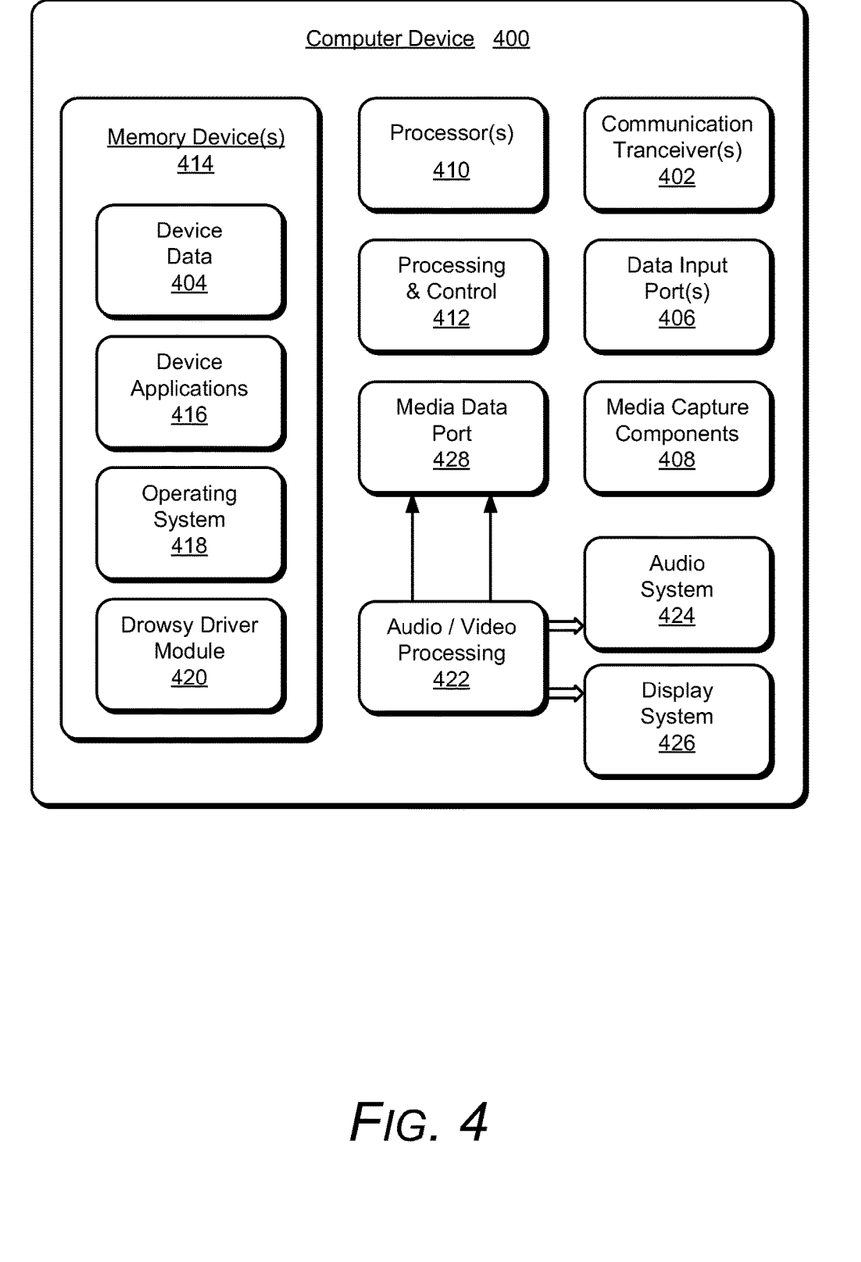
FIG. 4 illustrates various components of an example computer device that can implement embodiments of drowsy driver detection.

Wearable wireless device 104 also includes a processing system and a computer-readable storage medium, and can also be implemented with any number and combination of differing components as further described with reference to the example device shown in FIG. 4.

Vehicle kit device 106 is a wireless device that can be implemented in a vehicle, such as vehicle 108, pictured as a car in example 100. Vehicle kit device 106 can be installed in vehicle 108, or can be a removable device that can be placed in vehicle 108. Vehicle kit device 106 enables other wireless devices, such as wireless device 102 or wearable wireless device 104, to connect to the vehicle kit device over a wireless network, such as a WPAN. In some cases, vehicle kit device 106 is implemented as a hands-free device that enables hands-free communication through vehicle 108. For example, vehicle kit device 106 can enable a user of wearable wireless device 104 to place calls while wearable wireless device 104 is in the user's pocket or purse.

Similar to wireless device 102 and wearable wireless device 104, vehicle kit device 106 includes interface(s) 140 that enable wired and/or wireless communication of data. Interfaces 140 can include WPAN radios compliant with various WPAN standards, such as IEEE 802.15 standards, Bluetooth™ standards, IrDA standards, or wireless USB standards, to name just a few. Interfaces 140 can also include, by way of example and not limitation, WLAN radios compliant with any of the various IEEE 802.11 (also referred to as WiFi™) standards, WWAN radios for cellular telephony, WMAN radios compliant with various IEEE 802.16 (also referred to as WiMAX™) standards, and wired LAN Ethernet transceivers.

In example 100, interface 140 enables vehicle kit device 106 to establish wireless link 126 with wireless device 102. In some embodiments, wireless link 126 may be an active WPAN link. Vehicle kit device 106 also includes a processing system and a computer-readable storage medium, and can also be implemented with any number and combination of differing components as further described with reference to the example device shown in FIG. 4.

Drowsy Driver Module

In various embodiments, drowsy driver module 118 is configured to initiate a drowsy driver mode on wearable wireless device 104, such as a smart watch or smart bracelet, in response to detecting that the user is driving vehicle 108. Generally, the drowsy driver mode is configured to monitor the user while the user is driving, and initiate one or more alerts responsive to detecting that the user is drowsy or otherwise impaired.

In one or more embodiments, drowsy driver module 118 is implemented at wireless device 102 which is wirelessly connected to wearable wireless device 104. For example, wireless device 102 and wearable wireless device 104 may each be associated with a single user. The user, for example, can wear a smart watch on her wrist and carry a smart phone in her purse. Wireless device 102 is configured to establish wireless connection 124 with wearable wireless device 104. To establish wireless connection 124 with wearable wireless device 104, either wireless device 102 or wearable wireless device 104 initiates a discovery process to find the other device, and then establishes wireless connection 124. In some embodiments, wireless connection 124 may be a transport-agnostic WPAN communication link. Wireless connection 124 enables information to be passed between wireless device 102 and wearable wireless device 104. Once wireless connection 124 is established, each time that wireless device 102 and wearable wireless device 104 are powered on, the devices may automatically discover and connect to each other via wireless connection 124.

While the discussion below will focus on drowsy driver module 118 being implemented at wireless device 102, in some embodiments components of drowsy driver module 118 can be implemented on wearable wireless device 104. For example, wearable wireless device may be configured to perform the techniques described herein without using a separate wireless device 102.

Figure 2:
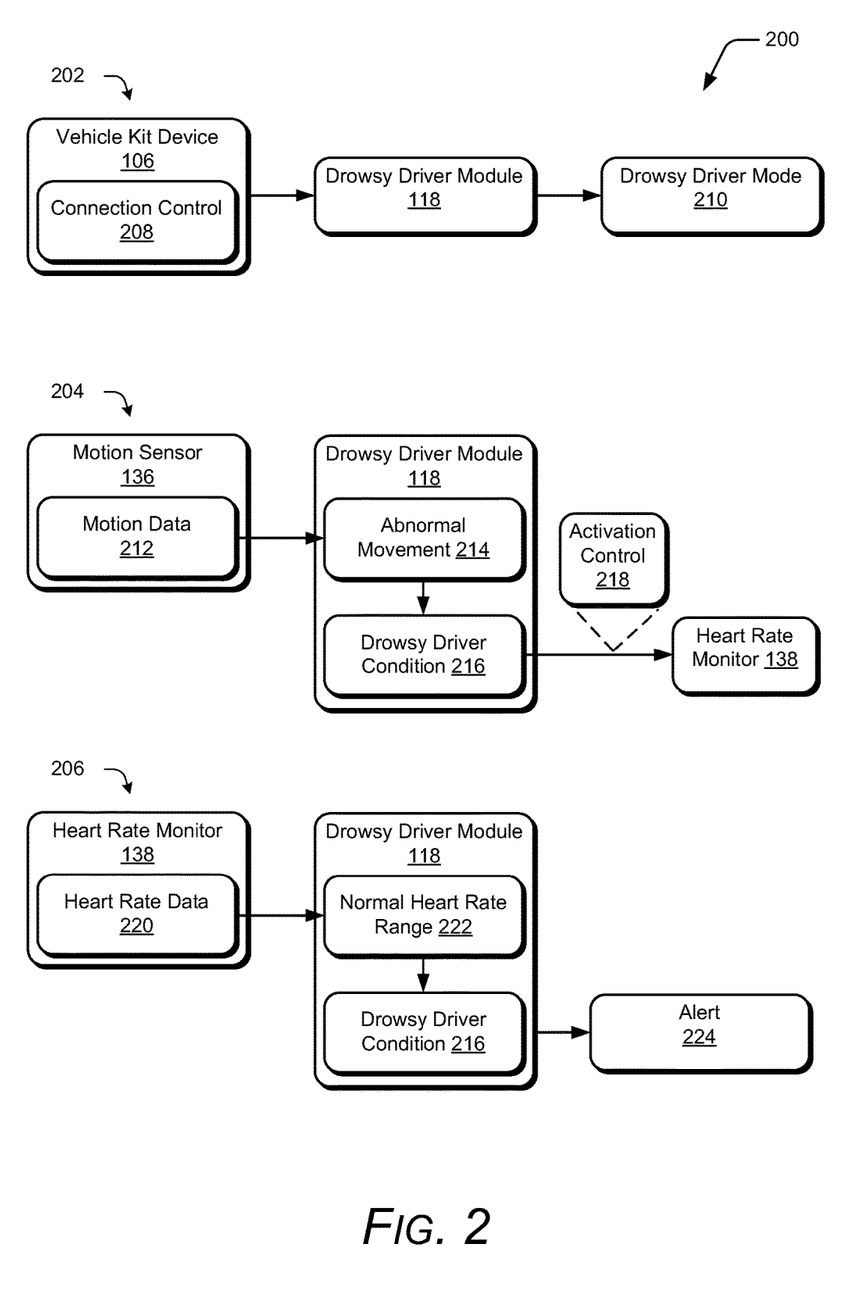
FIG. 2 illustrates a system in an example implementation in which a drowsy driver module initiates an alert in response to detecting a drowsy driver condition in accordance with one or more embodiments.

FIG. 2 illustrates a system 200 in an example implementation in which a drowsy driver module initiates an alert in response to detecting a drowsy driver condition in accordance with one or more embodiments. System 200 is illustrated through the use of first, second, and third stages 202, 204, and 206, respectively.

Detecting the User is Driving a Vehicle

At first stage 202, drowsy driver module 118 detects that the user is driving vehicle 108. In accordance with various embodiments, drowsy driver module 118 is configured to detect that a user is driving vehicle 108 based on a connection status of wireless device 102 with vehicle kit device 106 of vehicle 108. In this example, wireless device 102 receives a connection control 208 communicated from vehicle kit device 106 of vehicle 108. Connection control 208, for example, may be implemented as a Bluetooth connection control which enables wireless device 102 to establish a wireless connection (e.g., Bluetooth connection) with vehicle kit device 106. Connection control 208 may be detected by drowsy driver module 118 when the user is within vehicle 108 and vehicle 108 is turned on.

In some embodiments, drowsy driver module 118 can determine whether the user is a driver, or an operator, of vehicle 108 or a passenger in vehicle 108. This determination can be based on an assumption that the driver is likely the owner of vehicle 108, and has configured wireless device 102 to automatically connect to vehicle kit device 106. Thus, by detecting connection control 208, and monitoring the connection status of first wireless device to determine that wireless device 102 is connected to vehicle kit device 106, drowsy driver module 118 can determine that the user is the driver of vehicle 108. Alternately, if connection control 208 of vehicle kit device 106 is detected, but drowsy driver module 118 determines that wireless device 102 is not connected to vehicle kit device 106, then drowsy driver module 118 can determine that the user is a passenger in vehicle 108.

In one or more embodiments, drowsy driver module is further configured to determine that the user is driving vehicle 108 based on motion data received from sensors implemented at wireless device 102 and/or wearable wireless device 104. For example based on acceleration data received from an accelerometer, implemented at wireless device 102 and/or wearable wireless device 104, that indicates an acceleration of 20 mph or greater, drowsy driver module 118 can determine that the user is driving vehicle 108. In some cases, drowsy driver module 118 can determine that the user is driving vehicle 108 based on both the connection status of wireless device 102 with vehicle kit device 106 and the acceleration data. For example, drowsy driver module 118 can detect that the user is in vehicle 108 based on the connection status, and then determine that the user is driving vehicle 108 when the acceleration data indicates an acceleration or speed above a certain threshold.

In response to detecting that the user is driving vehicle 108, drowsy driver module 118 initiates a drowsy driver mode 210. Generally, the drowsy driver mode 210 is configured to monitor the user, and to provide one or more alerts in the event that the user becomes drowsy or otherwise impaired while driving vehicle 108. Note that the drowsy driver mode 210 is not initiated if drowsy driver module 118 detects that the user is a passenger in vehicle 108 because there is no need to ensure that the user stays awake and alert.

Drowsy driver module 118 can initiate the drowsy driver mode 210 in a variety of different ways. In one or more embodiments, drowsy driver module 118 implemented at wireless device 102 communicates one or more notifications to wearable wireless device 104 over wireless connection 124 to cause wearable wireless device 104 to activate drowsy driver mode 210. Alternately, components of drowsy driver module 118 implemented at wearable wireless device 104 may be configured to detect that the user is driving vehicle 108 on its own, and in response drowsy driver module 118 on wearable wireless device 104 activates the drowsy driver mode 210 automatically and without receiving any type of notification from wireless device 102.

Detecting a Drowsy Driver Condition

When drowsy driver mode 210 is activated, wearable wireless device 104 monitors the user's behavior using one or more first sensors of the wearable device, and generates first sensor data. Drowsy driver module 118 analyzes the first sensor data to determine a drowsy driver condition. As described herein, the "drowsy driver condition" corresponds to the user being drowsy, asleep, or otherwise impaired due to a medical condition, such as a heart attack, seizure, or stroke. In some embodiments, the drowsy driver condition may also correspond to the user suffering an injury caused by an accident of vehicle 108.

In one or more embodiments, the first sensor is a motion sensor, such as an accelerometer or gyroscope. For example, at second stage 204, motion sensor 136 detects movement, and generates motion data 212 corresponding to the movement. As noted above, because wearable wireless device 104 may be worn on the user's wrist, motion data 212 may correspond to movement of the user's hand. The motion data is then communicated to drowsy driver module 118. When implemented at wireless device 102, motion data 212 is communicated to drowsy driver module 118 over wireless connection 124.

Drowsy driver module 118 receives motion data 212 from motion sensor 136, and compares motion data 212 to a movement threshold to determine whether motion data 212 corresponds to an abnormal movement 214 that is indicative of a drowsy driver condition 216. The movement threshold, for example, may correspond to a normal amount of motion that may be generated during the normal course of driving vehicle 108. Thus, if motion data 212 includes motion that is greater than the movement threshold, drowsy driver module 118 determines that an abnormal movement 214 has occurred that is indicative of the drowsy driver condition 216. For example, if the user falls asleep while driving vehicle 108, the user's arm may quickly move or drop off of the steering wheel of vehicle 108, which results in a quick acceleration which may be detected by motion sensor 136.

Confirming the Drowsy Driver Condition

While abnormal movement 214 may be indicative of a drowsy or impaired driver, it is also possible that the abnormal movement may be a false positive. For example, the abnormal movement may be due to the user quickly moving her hand to wave at a neighbor. Thus, in order to increase the accuracy of detecting a drowsy driver and decrease false positives, drowsy driver module 118 is configured to confirm the drowsy driver condition.

In one or more embodiments, drowsy driver module 118 confirms the drowsy driver condition by causing activation of one or more second sensors at wearable wireless device 104 to generate second sensor data which may be analyzed to confirm drowsy driver condition 216.

Notably, the second sensor is not activated until the drowsy driver condition 216 is detected using the first sensor. Doing so increases the battery life of wearable wireless device 104 because the second sensor does not user power resources until it is needed to confirm drowsy driver condition 216. Furthermore, in one or more embodiments, the first sensor is a "low power" sensor that uses relatively less power resources than the second sensor.

In example 200, drowsy driver module 118 causes activation of heart rate monitor 138 to confirm drowsy driver condition 216. Heart rate monitor 138 can be used to confirm drowsy driver condition 216 because a person's heart rate may be indicative of drowsiness, a medical condition, or stress. As a user becomes drowsy and falls asleep, for example, the user's heart rate decreases. Similarly, a user's heart rate may increase due to a heart attack or from stress related to an injury. It is to be appreciated, however, that other types of sensors may be used in place of, or in combination with, heart rate monitor 138. For example, any type of sensor configured to monitor stress, temperature, or any other of a user's vital signs may be usable to confirm drowsy driver condition 216.

To cause activation of heart rate monitor 138, drowsy driver module 118 communicates an activation control 218 to heart rate monitor 138 at wearable wireless device 104 over wireless connection 124. Activation control 218 causes wearable wireless device 104 to enable, or power on, heart rate monitor 138.

At third stage 206, heart rate monitor 138, once enabled, detects a current heart rate of the user, and generates heart rate data 220 corresponding to the current heart rate of the user. Heart rate data 220 is then communicated to drowsy driver module 118. When implemented at wireless device 102, motion data 212 is communicated to drowsy driver module 118 over wireless connection 124.

Drowsy driver module 118 receives heart rate data 220 corresponding to the current heart rate of the user from heart rate monitor 138. To confirm drowsy driver condition 216, drowsy driver module 118 compares the current heart rate of the user to a normal heart rate range 222. Normal heart rate range 222 corresponds to a range of heart rates that are "normal" for the user while driving vehicle 108. This range may be based on users in general, or on the particular user. For example, some athletes may have much lower "resting" heart rates than the typical user. Thus, a "normal" heart rate for an athlete may be a "below normal" heart rate for a normal person.

Drowsy driver module 118 confirms the drowsy driver condition 216 if the current heart rate of the user is outside of normal heart rate range 222. For example, if heart rate data 220 indicates that the user's current heart rate is below normal heart rate range 222, this may indicate that the user has fallen asleep. Similarly, if heart rate data 220 indicates that the user's current heart rate is above normal heart rate range 222, this may indicate that the user is having a heart attack or seizure. Having a heart rate above normal heart rate range 222 may also be caused by stress or trauma due to an accident. For example, if the user crashes vehicle 108 into a tree, this may cause the user's heart rate to spike.

Alternately, if heart rate data 220 indicates that the current heart rate of the user is within normal heart rate range 222, then drowsy driver module 118 can determine that abnormal movement 214 was not due to a the driver being drowsy. Notably, using two different types of sensor data enables drowsy driver module 118 to more accurately confirm that the user is drowsy than existing solutions.

It is to be appreciated that a variety of different first sensors and second sensors can be used to detect and confirm drowsy driver condition 216. In one or more embodiments, the one or more first sensors may include vehicle sensors that are configured to detect acceleration of vehicle 108. For example, one or more accelerometers can be implemented at wireless device 102, wearable wireless device 104, and/or vehicle 108.

The vehicle sensors can be implemented to detect drowsy driver condition 216 by detecting a sudden change in acceleration of vehicle 108 (e.g., a sudden deceleration), which may be indicative of a collision. The sudden deceleration of vehicle 108 can be used to trigger the one or more second sensors (e.g., heart rate monitor 138) to confirm that vehicle 108 has been involved in a collision. For example, if vehicle 108 is involved in a collision, the user's heart rate may spike above normal heart rate range 222 due to an injury or stress caused by the collision of vehicle 108, which will be detected by heart rate monitor 138 to confirm the drowsy driver condition.

Initiating an Alert

In response to detecting and confirming drowsy driver condition 216 (e.g., an abnormal movement is detected and the user's current heart rate is outside of the normal heart rate range 222), drowsy driver module 118 initiates an alert 224. Alert 224 may include a variety of different types of alerts. Generally, alert 224 is intended to wake up the drowsy user, warn other passengers in the vehicle that the user is drowsy or otherwise impaired, and/or notify an emergency operator or the user's family to request help.

In one or more embodiments, alert 224 is configured to cause the user to wake up. For example, alert 224 may be implemented as an audible alert that causes the drowsy driver to wake up and focus on driving. Drowsy driver module can initiate the audible alert to be output from one or more speakers of wireless device 102, one or more speakers of wearable wireless device 104, and/or one or more speakers of vehicle 108. Such audible alerts may also serve to notify other passengers in vehicle 108 so that the passengers may assist the user in waking up, or offer to drive vehicle 108 so that the user can sleep. Alternately or additionally, alert 224 may also include a vibrational alert that causes the user to wake up. For example, drowsy driver module 118 can cause wearable wireless device 104 to vibrate to cause the user to wake up.

In some cases, drowsy driver module 118 may determine that the drowsy driver condition corresponds to a medical emergency, such as the user having a heart attack, stroke, seizure, or suffering an accident. For example, if the user's current heart rate is above normal heart rate range 222, this may be a sign that the user is suffering a heart attack or is suffering from extreme stress due to an accident. In this case, drowsy driver module 118 can be configured to automatically contact an emergency operator (e.g., by dialing 911) to request help for the user. Drowsy driver module 118 may also be configured to provide a current location of the user, so that an emergency team may be dispatched to the user's current location.

In one or more implementations, drowsy driver module is configured to provide alert 224 by requesting voice-feedback from the user. For example, drowsy driver module 118 can ask the user if the user is "ok". Based on the response from the user, or lack thereof, drowsy driver module 118 can automatically contact the emergency operator. For example, if the user does not respond to the request for voice-feedback, this may be a sign that the user is unconscious and needs help. Similarly, if the user indicates that they are "ok", then the drowsy driver module 118 can follow up with other questions to ensure that the user does not need help.

Example Method

Figure 3:
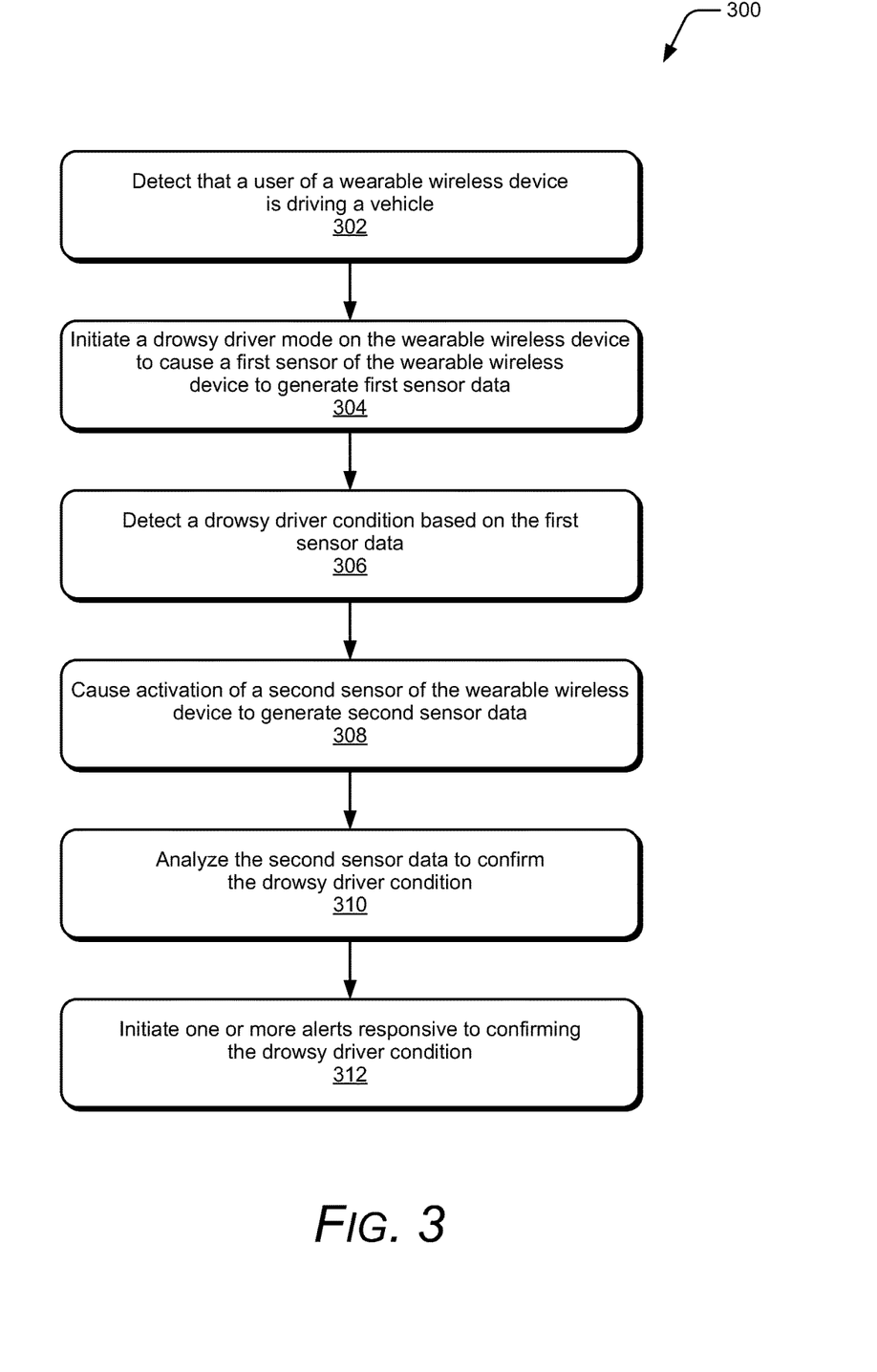
FIG. 3 illustrates an example method of drowsy driver detection in accordance with one or more embodiments.

FIG. 3 illustrates an example method 300 of drowsy driver detection in accordance with one or more embodiments. The order in which the method blocks are described are not intended to be construed as a limitation, and any number or combination of the described method blocks can be combined in any order to implement a method, or an alternate method. Example method 300 is described with reference to FIGS. 1 and 2 in accordance with one or more embodiments of drowsy driver detection. Generally, any of the methods, components, and modules described herein can be implemented using software, firmware, hardware (e.g., fixed logic circuitry), manual processing, or any combination thereof. A software implementation represents program code that performs specified tasks when executed by a computer processor, and the program code can be stored in computer-readable storage media devices.

Block 302 detects that a user of a wearable wireless device is driving a vehicle. For example, drowsy driver module 118 detects that a user of wearable wireless device 104 is driving vehicle 108 based on a connection status of wireless device 102 with vehicle kit device 106 of vehicle 108.

In response to detecting that the user is driving a vehicle, block 304 initiates a drowsy driver mode on the wearable wireless device to cause a first sensor of the wearable wireless device to generate first sensor data. For example, drowsy driver module 118 initiates drowsy driver mode 210 on wearable wireless device 104 to cause motion sensor 136 of wearable wireless device 104 to generate motion data 212.

Block 306 detects a drowsy driver condition based on the first sensor data. For example, drowsy driver module 118 receives motion data 212 from motion sensor 136. Then, drowsy driver module 118 detects drowsy driver condition 216 by comparing motion data 212 to a movement threshold to determine whether motion data 212 corresponds to an abnormal movement 214 that is indicative of a drowsy driver condition 216.

In response to detecting the drowsy driver condition, block 308 causes activation of a second sensor of the wearable wireless device to generate second sensor data. For example, drowsy driver module 118 causes activation of heart rate monitor 138 to generate heart rate data 220 by communicating activation control 218 to heart rate monitor 138.

Block 310 analyzes the second sensor data to confirm the drowsy driver condition. For example, drowsy driver module 118 receives heart rate data 220 corresponding to a current heart rate of the user from heart rate monitor 138. Then, drowsy driver module 118 compares the current heart rate of the user to a normal heart rate range 222, and confirms the drowsy driver condition 216 if the current heart rate of the user is outside of normal heart rate range 222.

Block 312, initiates one or more alerts responsive to confirming the drowsy driver condition. For example, drowsy driver module 118 initiates one or more alerts 224 in response to confirming drowsy driver condition 216. Alert 224 can be configured to wake up the drowsy user, warn other passengers in the vehicle that the user is drowsy or otherwise impaired, and/or notify an emergency operator FIG. 4 illustrates various components of an example computer device 400 that can be implemented as any device described with reference to any of the previous FIGS. 1-3, such as wireless device 102, wearable wireless device 104, or vehicle kit device 106, to implement embodiments of drowsy driver detection. The computer device may be implemented as any one or combination of a fixed or mobile device, in any form of a consumer, computer, portable, user, communication, phone, navigation, gaming, media playback, and/or computer device.

The computer device 400 includes communication transceivers 402 that enable wired and/or wireless communication of device data 404, such as received data, data that is being received, data scheduled for broadcast, data packets of the data, etc. Example communication transceivers 402 include wireless personal-area-network (WPAN) radios compliant with various IEEE 802.15 standards, Bluetooth™ standards, wireless local-area-network (WLAN) radios compliant with any of the various IEEE 802.11 (also referred to as WiFi™) standards, wireless-wide-area-network (WWAN) radios for cellular telephony, wireless-metropolitan-area-network (WMAN) radios compliant with various IEEE 802.16 (also referred to as WiMAX™) standards, and wired local-area-network (LAN) Ethernet transceivers.

The computer device 400 may also include one or more data input ports 406 via which any type of data, media content, and/or inputs can be received, such as user-selectable inputs, messages, music, television content, recorded video content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the computer device to components, peripherals, or accessories such as microphones or cameras. Additionally, the computer device 400 may include media capture components 408, such as an integrated microphone to capture audio and a camera to capture still images and/or video media content.

The computer device 400 includes one or more processors 410 (e.g., any of microprocessors, controllers, and the like), which process computer-executable instructions to control operation of the device. Alternatively or in addition, the computer device can be implemented with any one or combination of software, hardware, firmware, or fixed logic circuitry that is implemented in connection with processing and control circuits, which are generally identified at 412. Although not shown, the computer device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computer device 400 also includes one or more memory devices 414 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The computer device 400 may also include a mass storage media device.

A memory device 414 provides data storage mechanisms to store the device data 404, other types of information and/or data, and various device applications 416 (e.g., software applications). For example, an operating system 418 can be maintained as software instructions within a memory device and executed on the processors 410. The device applications may also include a device manager, such as any form of a control application, software application, signal-processing and control module, code that is native to a particular device, a hardware abstraction layer for a particular device, and so on. In embodiments, the computer device also includes a drowsy driver module 420. Drowsy driver module 420 is an example of drowsy driver module 118, which may be implemented at wireless device 102 and/or or wearable wireless device 104, as shown in FIG. 1.

The computer device 400 also includes an audio and/or video processing system 422 that generates audio data for an audio system 424 and/or generates display data for a display system 426. The audio system and/or the display system may include any devices that process, display, and/or otherwise render audio, video, display, and/or image data.

Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 428. Additionally, the audio system and/or the display system may be external components to the computer device, or alternatively, are integrated components of the example computer device.

Although embodiments of drowsy driver detection have been described in language specific to features and/or methods, the subject of the appended claims is not necessarily limited to the specific features or methods described. Rather, the specific features and methods are disclosed as example implementations of drowsy driver.

The invention claimed is:

1. A wireless device, comprising:
an interface configured to establish a wireless connection with a wearable wireless device associated with a user;
a memory coupled to the interface; and
a processor coupled to the interface to implement a drowsy driver module, the drowsy driver module configured to:
determine that the user is driving a vehicle;
initiate a drowsy driver mode on the wearable wireless device that causes a motion sensor of the wearable wireless device to monitor for movement of the user and generate motion data corresponding to the movement;
analyze the motion data to detect a drowsy driver condition, the drowsy driver condition indicating that the user may be drowsy;
in response to determining the drowsy driver condition, cause activation of a heart rate monitor on the wearable wireless device to generate heart rate data corresponding to a current heart rate of the user;
analyze the heart rate data to confirm the drowsy driver condition; and
initiate one or more alerts in response to confirming the drowsy driver condition.

2. The wireless device of claim 1, wherein the drowsy driver module is configured to detect the drowsy driver condition by:
comparing the motion data to a movement threshold; and
detecting the drowsy driver condition if an abnormal movement pattern is detected based on the comparison.

3. The wireless device of claim 1, wherein the drowsy driver module is configured to confirm the drowsy driver condition by:
comparing the current heart rate of the user to a normal heart rate range; and
confirm the drowsy driver condition if the current heart rate of the user is outside of the normal heart rate range.

4. The wireless device of claim 3, wherein the drowsy driver module is configured to confirm the drowsy driver condition if the current heart rate of the user is below the normal heart rate range.

5. The wireless device of claim 3, wherein the drowsy driver module is configured to confirm the drowsy driver condition if the current heart rate of the user is above the normal heart rate range.

6. The wireless device of claim 3, wherein the drowsy driver module is further configured to de-activate the heart rate monitor on the wearable wireless device if the current heart rate of the user is within the normal heart rate range.

7. The wireless device of claim 1, wherein the one or more alerts comprise one or more audible alerts.

8. The wireless device of claim 7, wherein the one or more audible alerts are output from one or more speakers of the wearable wireless device, one or more speakers of the wireless device, or one or more speakers of the vehicle.

9. The wireless device of claim 1, wherein the drowsy driver module is configured to initiate the one or more alerts by automatically contacting an emergency operator to request help for the user.

10. The wireless device of claim 1, wherein the drowsy driver module is configured to determine that the user is driving the vehicle based on a connection status of the wireless device with a vehicle kit device associated with the vehicle.

11. The wireless device of claim 1, wherein the drowsy driver module is configured to initiate the drowsy driver mode on the wearable wireless device by communicating at least one notification to the wearable wireless device over the wireless connection.

12. The wireless device of claim 1, wherein the drowsy driver module is configured to activate the heart rate monitor on the wearable wireless device by communicating one or more activation controls to the wearable wireless device over the wireless connection to cause the wearable wireless device to enable the heart rate monitor.

13. The wireless device of claim 1, wherein the wireless device comprises a smart phone, and wherein the wearable wireless device comprises one of a smart watch or a smart bracelet.

14. A computer-implemented method comprising:
initiating a drowsy driver mode on a wearable wireless device being worn by a user in response to detecting that the user is driving a vehicle;
in response to initiating the drowsy driver mode, causing the wearable wireless device to generate first sensor data using a first sensor;
analyzing the first sensor data to detect a drowsy driver condition;
in response to detection of the drowsy driver condition, causing activation of a second sensor on the wearable wireless device to generate second sensor data;
analyzing the second sensor data to confirm the drowsy driver condition; and
initiating one or more alerts in response to confirming the drowsy driver condition.

15. The computer-implemented method of claim 14, wherein the first sensor of the wearable wireless device comprises a low-power sensor that uses relatively less power than the second sensor of the wearable wireless device.

16. The computer-implemented method of claim 14, wherein the first sensor comprises a motion sensor that is configured to monitor movement of the user's hand and generate motion data based on the movement, and wherein the second sensor comprises a heart rate monitor that is configured to monitor a current heart rate of the user and generate heart rate data based on the current heart rate of the user.

17. The computer-implemented method of claim 14, wherein at least one of the initiating, analyzing, activating, analyzing, or initiating is performed by a drowsy driver module implemented at a wireless device that is wirelessly connected to the wearable wireless device.

18. The computer-implemented method of claim 14, wherein at least one of the initiating, analyzing, activating, analyzing, or initiating is performed by a drowsy driver module implemented at the wearable wireless device.

19. A wearable wireless device, comprising:
- a motion sensor configured to sense movement of a hand of a user wearing the wearable wireless device;
- a heart rate monitor configured to detect a current heart rate of the user;
- at least a memory and a processor to implement a drowsy driver mode in response to detecting that the user is driving a vehicle, the drowsy driver mode configured to:
  - monitor movement of the user's hand using the motion sensor to detect an abnormal movement;
  - enable the heart rate monitor in response to detecting the abnormal movement; and
  - initiate one or more audible alerts if the current heart rate of the user is outside of a normal heart rate range.

20. The wearable wireless device of claim 19, wherein the wearable wireless device is wirelessly connected to a car kit device of the vehicle, and wherein the drowsy driver mode is configured to initiate the one or more audible alerts by communicating a control signal to the car kit device to cause the one or more audible alerts to be output using one or more speakers of the vehicle.

* * * * *